United States Patent [19]
Hashimoto

[11] Patent Number: 5,276,734
[45] Date of Patent: Jan. 4, 1994

[54] OSCILLATOR SYSTEM

[75] Inventor: Takashi Hashimoto, Tokyo, Japan

[73] Assignee: Pioneer Electronic Corporation, Tokyo, Japan

[21] Appl. No.: 943,615

[22] Filed: Sep. 11, 1992

[30] Foreign Application Priority Data

Sep. 11, 1991 [JP] Japan .................. 3-259797

[51] Int. Cl.⁵ .................................... H04N 7/167
[52] U.S. Cl. .......................... 380/7; 380/6; 331/1 A
[58] Field of Search ............... 380/6, 7, 8; 358/349; 455/26.1; 331/1A, 17, 31, 175

[56] References Cited

U.S. PATENT DOCUMENTS

| | | | |
|---|---|---|---|
| 4,518,929 | 5/1985 | Owen | 331/17 X |
| 4,613,826 | 9/1986 | Masuko et al. | 331/17 X |
| 4,792,971 | 12/1988 | Uemura | 380/7 |
| 4,817,197 | 3/1989 | Shimizu et al. | 31/17 X |
| 4,912,760 | 3/1990 | West, Jr. et al. | 380/7 |
| 4,914,695 | 4/1990 | Martin | 380/7 |

Primary Examiner—Tod R. Swann
Attorney, Agent, or Firm—Nikaido, Marmelstein, Murray & Oram

[57] ABSTRACT

A system for producing an oscillating signal to be used for jamming signal for a band of CATV has a voltage producing circuit for producing a control voltage corresponding to the band, a first oscillator circuit for producing a first oscillating signal having a frequency dependent on the control voltage, and a second oscillator circuit for producing a fixed second oscillating signal. The frequencies of the first and second signals are combined to produce a final oscillating signal. A deviation of the frequency of the actual final oscillating signal from a desired final oscillating is detected, and the deviation is corrected with a correcting value corresponding to the deviation.

12 Claims, 3 Drawing Sheets

OSCILLATOR SYSTEM

BACKGROUND OF THE INVENTION

The present invention relates to an oscillator system for producing a jamming signal in a CATV (cable television) system or an intermediate frequency signal in a double superheterodyne receiver.

A system for producing a jamming signal for preventing nonsubscribers from poaching pay television programs is explained as an example.

A subscriber who contracted with a center of a CATV must pay a fee monthly or a fee for every program in order to receive television programs from the CATV. Accordingly, it is necessary to be able to prevent the cheating of pay television programs. There are some scrambling systems where the television signal is processed at the center so that the television signal can not be received through an ordinary television set.

In a jamming method as one of the scrambling systems, an interference wave or noise is inserted in a band of the CATV signal.

FIG. 3 shows a conventional jamming signal producing system. The system is provided in a distributor unit 2b provided out of doors of a home of a subscriber.

A TV signal from a center is applied to a distributor 2a of the system through a transmission line 1 and a directional coupler 2. The TV signal is distributed and applied to individual television sets of subscribers through respective distributor units 2b each having a directional coupler 3 for distributing the TV signal.

The jamming signal producing system has a jamming signal producing circuit comprising a PLL circuit including a voltage controlled first oscillator 6 which produces a first jamming signal. The system further has a second oscillator 7 which comprises, for example, a surface acoustic wave (SAW) resonator to produce a second jamming signal at a fixed frequency of 668 MHz.

The PLL circuit comprises a 1/N divider 14 for dividing the output frequency of the first oscillator 6, a programmable divider 13b, a phase comparator 13c, a low pass filter (LPF) 13d, and the first oscillator 6. The programmable divider 13b is provided to produce a plurality of signals of different frequencies. Each frequency corresponds to a frequency of a channel. The output of the programmable divider 13b is connected to an input of the phase comparator 13c. The phase comparator 13c compares the output of the programmable divider 13b with a reference frequency from a reference frequency generator 13a. The output of the oscillator 6 is connected to a mixer 8 to which the oscillator 7 is connected. The mixer 8 is connected to a combiner 5 through an RF switch 12 and a low pass filter 9. The combiner 5 is fed with the TV signal from the directional coupler 3 through a buffer amplifier 4.

The system has a data signal detector 10 to which the data signal from the directional coupler 3 is fed and a control unit 11 connected to the detector 10. The control unit 11 is operatively connected to the programmable divider 13b and the RF switch 12. In operation, the data signal detector 10 derives a data signal from the TV signal applied from directional coupler 3. When the data signal represents a TV signal of a channel which is not contracted by the subscriber, the control unit 11 applies a control signal to the RF switch 12 to close it. The control unit 11 applies a control signal to the programmable divider 13b so that the programmable divider produces a signal of a frequency corresponding the frequency of the channel. The phase comparator 13c produces an output necessary for producing a control voltage corresponding to the channel to be scrambled. The oscillator 6 accordingly generates a first jamming signal. On the other hand, the second oscillator 7 generates a second local signal of a fixed frequency. The first jamming signal and second local signal are mixed by the mixer 8 to produce a second jamming signal which is fed to the combiner 5.

The resultant second jamming signal is combined with the carrier signal at the combiner 5 so that neither the video signal nor the audio signal of the scrambled channel can be reproduced. When the TV signal is that of a channel which is under contract with the subscriber, the control unit 11 opens the RF switch 12 so that the channel is not scrambled. Furthermore, when a free of charge program is included in a TV signal, the control unit 11 opens the switch 12 only the period of the free program so that nonsubscribers can watch the program.

Experience has shown that the most effective jamming signal combined with a TV signal by the combiner 5 is a signal, the frequency of which is deflected from the picture-carrier frequency of the TV signal by about 250 KHz to the sound-carrier frequency. For instance, in Channel 2 of the United States CATV system through which pay TV programs are transmitted, the frequency of the TV signal is 55.25 MHz. Hence the preferable jamming signal is 55.5 MHz. For example, since the frequency of the signal from the second oscillator 7 is 668 MHz, the desired frequency of the signal from the first oscillator 6 is 723.5 MHz, thereby providing a final jamming signal of 55.5 MHz which is equal to the difference between the signals.

A TV signal of Channel W of the U.S. CATV is 295.25 MHz. In order to produce a desired final jamming signal of 295.5 MHz, the first oscillator 6 is controlled so as to generate a signal of 963.5 MHz (668+295.25+0.25) MHz.

Considering the stability of frequency and variations in characteristics of the oscillator caused by change in temperature and humidity, it is generally thought that the above-mentioned SAW resonator is the best choice as the second oscillator. However, due to the manufacturing variance and mounting conditions at assemblage of the system, the resonant frequency may vary in a range of ±150 KHz. Thus the final jamming signal to be combined with the carrier signal is deviated by 100 to 400 KHz from the desired jamming signal. Although the systems which generate a jamming signal having a frequency deflected from the picture-carrier frequency by 250 KHz has very good scrambling effect, if the jamming frequency deviates from the desired frequency, the scrambling effect cannot be obtained.

SUMMARY OF THE INVENTION

An object of the present invention is to provide an oscillator system which may produce a signal with the desired frequency.

According to the present invention, there is provided an oscillator system comprising, a first oscillator circuit including a control voltage producing circuit for producing a control voltage corresponding to the band, and a voltage-controlled first oscillator for producing a first oscillating signal having a first frequency dependent on the control voltage, a second oscillator circuit for producing a fixed second oscillating signal, means for producing a final oscillating signal in accordance with the combination of frequencies of the first and second signals, correcting value setting means for setting a correcting value for correcting an aberration of the frequency of the actual final oscillating signal from a desired final oscillating signal, and control means for controlling the frequency of the first oscillating signal in accordance with the correcting value.

Thus, when the frequency of the actual final oscillating signal is aberrant from that of the desired signal, the control voltage produced by the control voltage producing circuit is corrected in accordance with the correcting value. Accordingly, the frequency of the first oscillating signal is offset from the original frequency, thereby correcting the deviation.

The other objects and features of this invention will become understood from the following description with reference to the accompanying drawings.

DETAILED DESCRIPTION OF THE PREFERRED EMBODIMENTS

Embodiments of the present invention are described hereinafter with reference to FIGS. 1 and 2, wherein the same references as those in FIG. 3 designate the same parts as the parts in FIG. 3.

Figure 1:
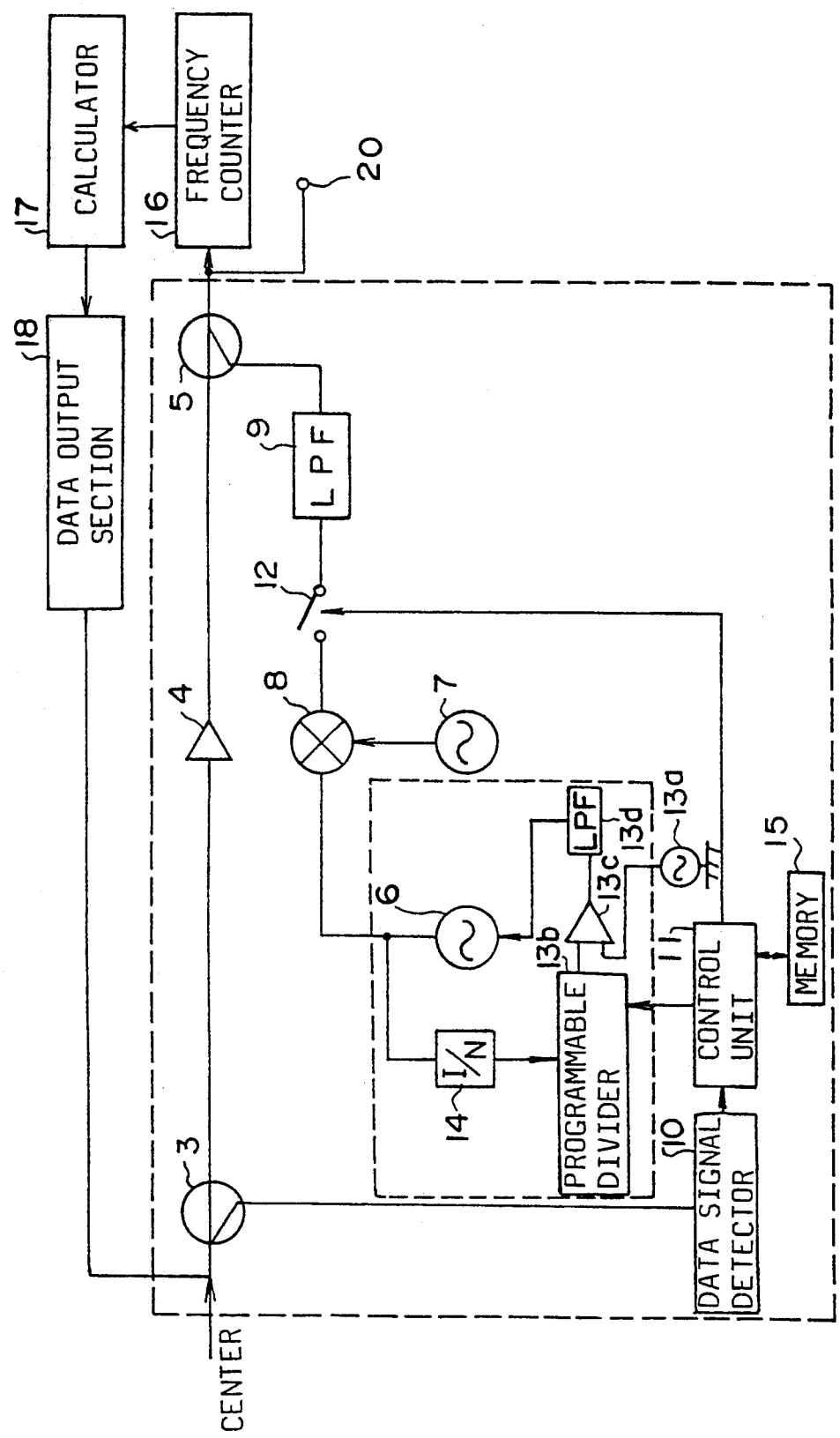
FIG. 1 is a schematic diagram showing a jamming signal producing system according to the present invention.

Referring to FIG. 1, a jamming signal producing system to which the present invention is applied has a conventional jamming signal producing circuit comprising a PLL circuit including the voltage-controlled first oscillator 6 and the second oscillator 7 which includes an acoustic wave device such as a SAW resonator.

The PLL circuit comprises the 1/N divider 14, programmable divider 13b, phase comparator 13c, low pass filter (LPF) 13d, and the first oscillator 6. The output of the programmable divider 13b is connected to the input of the phase comparator 13c. The phase comparator 13c compares the output of the programmable divider 13b with a reference frequency from the reference frequency generator 13a to produce a signal having a voltage dependent on the phase difference. The voltage signal is converted to a control voltage of a DC voltage by the LPF 13d. The output of the oscillator 6 is connected to the mixer 8. The second oscillator 7 is connected to the mixer 8 which is connected to the combiner 5 through the RF switch 12 and the low pass filter 9.

The control unit 11, which is connected to the directional coupler 3 through the data signal detector 10, has a ROM wherein a plurality of codes of the channels to be scrambled are stored, and a RAM for storing one of the channel codes derived from the ROM. The data on the code in the RAM may be changed in accordance with a command from the center of the CATV system.

The data signal detector 10 derives a data signal from the TV signal fed from the directional coupler 3. When the data signal represents that the channel of the TV signal is not the channel under contract, the code of the channel is derived from the ROM of the control unit 11 and stored in the RAM.

The control unit 11 applies a control signal to the programmable divider 13b in accordance with the code stored in the RAM to the programmable divider 13b. The phase comparator 13c produces an output necessary for producing a control voltage corresponding to a channel to be scrambled.

The control unit 11 further applies a control signal to the RF switch 12 to close it when the code is stored in the RAM. A memory 15 is connected to the control unit. The memory stores a correcting value for correcting the frequency of the first oscillator 6, the operation of which will be described later in detail.

A first jamming signal generated by the first oscillator 6 in dependency on the control voltage is applied to a mixer 8, to which a fixed local signal, the frequency of which is for example 668 MHz, is fed from the second oscillator 7 to produce a final jamming signal. The final jamming signal is applied to the combiner 5 through the RF switch 12 and the LPF 9, so as to be combined with the TV signal from the directional coupler 3. As a result, the TV signal is scrambled. The scrambled TV signal is applied to a TV receiver at a terminal 20.

On the other hand, the combiner 5 is connected to a correcting value (offset value) setting device comprising a frequency counter 16 which counts the frequency of an actual final jamming signal, calculator 17 for calculating a correcting value for correcting the aberration, and a data output section 18 connected to the control unit 11 through the directional coupler 3 and the data signal detector 10. The calculator 17 has a memory storing a desired jamming signal and functionally connected to the control unit 11 so as to be operated in synchronism with the control unit. The calculator 17 calculates the difference between the actual frequency counted by the counter 16 and the stored desired jamming signal, and produces a correcting value dependent on the difference. The control unit 11 is operated to control the control voltage in accordance with the correcting value produced by the calculator 17 so that the frequency of the first oscillator 6 is adjusted. As a result, the aberration of the actual jamming signal from the desired jamming signal is corrected. The correcting value is stored in the memory 15.

The operation of the present invention, which is performed in a factory at manufacturing or during a repair, is described hereinafter, taking Channel W of CATV system based on the U.S. broadcasting standard as an example. The desired frequency of a final jamming signal for scrambling Channel W, the TV carrier frequency of which is 295.25 MHz, is 295.5 MHz, deflected by 250 KHz from the TV signal.

The Channel W TV signal is fed from the center to the directional coupler 3 provided in the distributor unit of a subscriber. The TV signal is applied to the combiner 5 through the buffer amplifier 4, and fed to the control unit 11 through the data signal detector 10. When the data signal detector 10 detects that the data signal is not that of the channel under contract, a code which corresponds to Channel W is derived from the ROM provided in the control unit 11 and stored in the RAM. The code is, for example, a number relative to the frequency of the desired jamming signal, such as 15416, which represents a dividend of the desired frequency 963.5 MHz of the first oscillator 6 divided by the frequency 62.5 KHz of the reference frequency generator 13a.

The control signal corresponding to the code 15416 from the control unit 11 is applied to the programmable divider 13b in accordance with a program, so that the divider produces an output having a frequency corresponding to Channel W which is to be scrambled. The phase comparator 13c compares the output with a reference frequency of 62.5 KHz from the reference frequency generator 13a to obtain a difference phase. The difference phase is converted to the control voltage which is applied to the first oscillator 6. Thus, the first oscillator 6 produces first jamming signal having a frequency of 963.5 MHz. The first jamming signal is applied to the mixer 8.

The second oscillator 7 generates a fixed second signal of 688 MHz. The first jamming signal and fixed second signal are mixed by the mixer 8 to obtain a final jamming signal in accordance with the difference between the frequencies of the jamming signals, namely, 295.5 MHz (963.5 MHz−688 MHz=295.5 MHz). The final jamming signal is fed to the combiner 5 through the RF switch and the LPF 9.

However, if the frequency of the second oscillator 7 is deviated from the predetermined frequency of 668 MHz by 100 KHz to 668.1 MHz, for example, because of the manufacturing variance of the SAW resonator and deviation of characteristics of circuit elements from respective basic characteristics, the final signal of 295.4 MHz is applied to the combiner 5. The frequency counter 16 of the correcting value setting device counts the deviation of −100 KHz. A counted value of 295.4 MHz which is deviated by −100 KHz is fed to the calculator 17 where a correcting value is obtained. More particularly, the correcting value is an integral multiplier of the frequency of the reference frequency generator 13a when the multiple of thereof is closest to the aberration. If the frequency of the signal from the reference frequency generator is 62.5 KHz, the multiple thereof closest to the aberration 100 KHz is 125 KHz where the multiplier is 2. Thus the correcting (offset) value is set to 2 by the calculator 17.

The correcting value is fed to the control unit 11 through the data output section 18 and the data signal detector 10 by the same carrier as the data transmitted from the center, for example using the FSK signal. Thus, the frequency of the first oscillator 6 is increased by 125 KHz (62.5 KHz×2), which is approximate to the aberration 100 KHz, to 963.625 MHz (963.5 MHz+125 KHz). Consequently, the final jamming signal at the mixer 8 is 295.525 MHz (963.625−668.1 MHz). That is, the actual jamming signal is deviated from the desired jamming signal of 295.5 MHz by only 25 KHz. After the correcting value 2 which may also be called offset value is stored in the memory 15, the correcting values for other channels are obtained and stored in the memory 15 in the same manner at every channel, so that the aberration can be accurately corrected. The correcting value setting device is removed from the system once the correcting values are stored.

Although the above described embodiment employs a PLL circuit for controlling the operation of the first oscillator 6, the present embodiment may be modified. For example, the first oscillator 6 is connected to capacitors, the number of which corresponds to the number of channels to be scrambled. Each capacitor is charged with a control voltage which corresponds to the correcting value. When a switch between the oscillator 6 and each capacitor is closed, the charged control voltage is applied to the oscillator so that the oscillator 6 generates a signal of a necessary frequency.

Figure 2:
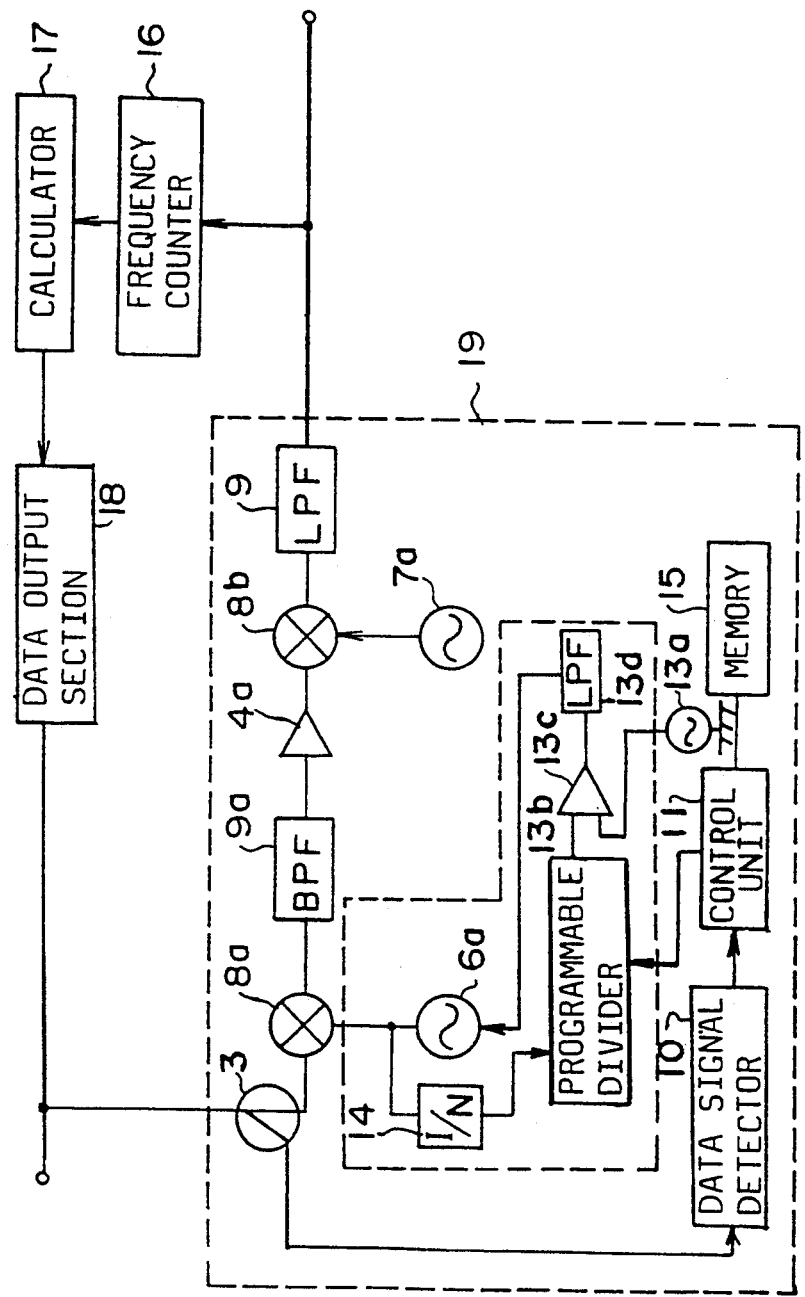
FIG. 2 is a schematic diagram showing a second embodiment of the present invention.
Figure 3:
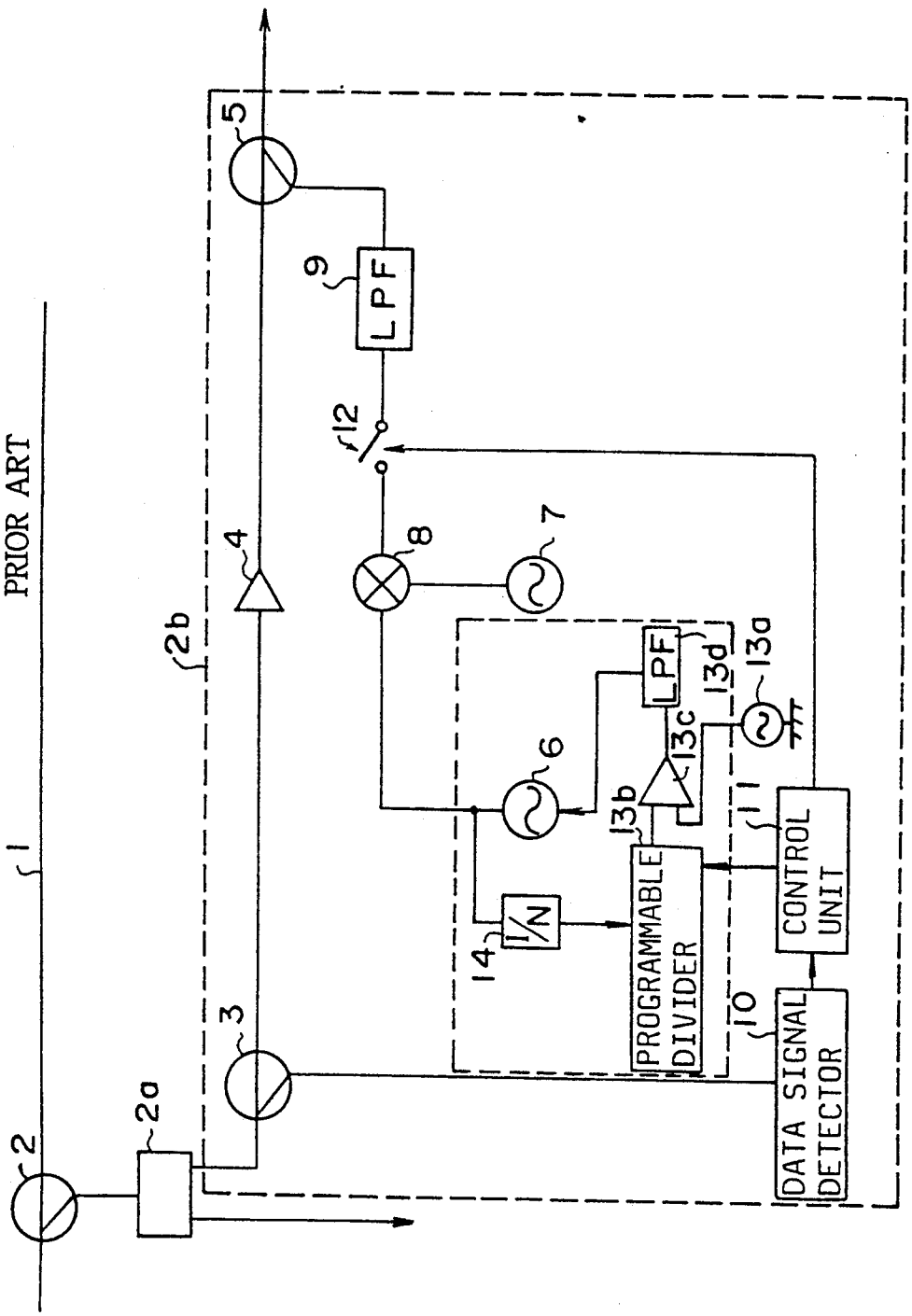
FIG. 3 is a schematic diagram showing a conventional jamming signal producing system.

FIG. 2 shows a second embodiment of the present invention which is applied to a double superheterodyne comprising a first local oscillator 6a forming a part of PLL circuit, second local oscillator 7a, data detector 10, control unit 11 and the memory 15. In the embodiment, the first local oscillator 6a is operated in the PLL circuit in the same manner as described in the first embodiment, and the second local oscillator 7a is an acoustic wave device.

The first oscillator 6a is connected to a mixer 8a wherein the locally generated signal from the oscillator 6a is mixed with the TV signal from the directional coupler 3. A resultant first intermediate frequency signal corresponds to the difference between the locally generated signal and the carrier frequency. The intermediate frequency signal is applied through a BPF 9a and a buffer amplifier 4a to a second mixer 8b where the intermediate frequency signal is mixed with a fixed second locally generated frequency, for example 668 MHz, from the second oscillator 7a. A resultant second intermediate frequency signal is fed through the LPF 9 to an intermediate frequency amplifier and a detector (not shown) of the receiver.

The LPF 9 is also connected to the correcting value setting device comprising the frequency counter 16, calculator 17 and the data output section 18.

The first intermediate frequency signal from the first local oscillator 6a is applied to the mixer 8a. The carrier signal which is converted into the first intermediate frequency signal is further mixed with the second local frequency signal from the second local frequency oscillator 7a by the mixer 8b, thereby generating the second intermediate frequency equal to the difference between the first intermediate frequency and the second local frequency.

The second intermediate frequency signal is fed to the frequency counter 16. If the second local oscillator 7 does not generate an accurate local frequency signal, the frequency counter 16 counts the frequency of the actual second intermediate frequency. The calculator 17 calculates the difference between the actual frequency and the desired intermediate frequency stored therein as is described in the first embodiment. For example, when the desired intermediate frequency is 55.35 MHz and the actual intermediate frequency is 55.25 MHz, the difference is 100 KHz. The calculator 17 produces a correcting value dependent on the difference.

The correcting value is fed from the data output section 18 to the control unit 11 through the directional coupler 3 and the data signal detector 10 and stored in the memory 15. The control unit 11 controls the programmable divider 13b to correct the aberration of the output frequency from the standard frequency 62.5 KHz. For example, when the aberration is close to 125 KHz, the multiplier 2 is stored in the memory as a correcting value. If the aberration is close to 62.5 KHz, the multiplier 1 is stored. After the correcting value is stored in the memory 15, the correcting value setting device is disconnected from the system.

From the foregoing it will be understood that the present invention provides an oscillator system having a VCO and a fixed frequency generator wherein, when the frequency of the fixed frequency generator deviates, the frequency of the VCO is corrected based on the deviation. Thus, when the present invention is applied to a jamming signal producing system for CATV, the channel which is not under contract with the subscriber is accurately scrambled. When applied to a double superheterodyne receiver, the receiver can be exactly turned to the receiving frequency, because the aberration is offset.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An oscillator signal producing system, the oscillation signal having an oscillation frequency which is determined by a frequency of an input signal, a reference frequency generated by a reference frequency generator, a first frequency and a fixed secondary frequency, the system comprising:

a control unit responsive to the input signal, for producing a control signal dependent on the input signal frequency;

a first oscillator responsive to the control signal for producing a first oscillating signal having the first frequency which is determined by the input signal frequency, the reference frequency and the fixed second frequency;

a second oscillator incorporating a fixed element, for producing a fixed second oscillating signal having the fixed second frequency;

a mixer means for producing a final oscillating signal by mixing the first oscillating signal and the second oscillating signal;

a detector means for detecting an aberration of the frequency of the final oscillating signal from the oscillation frequency;

correcting value setting means for producing a correcting value for correcting the detected aberration of the frequency of the final oscillating signal, in which the correcting value is an integral multiplier of the reference frequency;

storing means for storing the correcting value in a memory; and correcting means for correcting the frequency of the first oscillating signal in accordance with the correcting value so as to produce the oscillation signal having the oscillation frequency.

2. A system according to claim 1 wherein the first oscillator is incorporated in a phase-locked loop circuit.

3. A system according to claim 2 wherein the phase-locked loop circuit comprises a voltage-controlled oscillator as the first oscillator, a programmable divider controlled by the correcting means for producing a signal having a divided frequency, a phase comparator for comparing the divided frequency with a reference frequency, and the low pass filter for eliminating high frequency elements.

4. A system according to claim 1 wherein the fixed element is a surface acoustic wave resonator.

5. A system according to claim 1, wherein the memory of said storing means stores a plurality of control values for producing the control signals and a plurality of correcting values, one of the control values and one of the correcting values, which are determined by the input signal, are added to each other so that the first oscillator produces a corrected first oscillating signal.

6. A jamming signal producing system for a CATV system, the jamming signal having a jamming frequency which is determined by a TV frequency of a TV signal to be scrambled, a reference frequency generated by a reference frequency generator, a first frequency and a fixed second frequency, comprising:

a control unit responsive to a TV signal for producing a control signal dependent on the TV frequency;

a first oscillator responsive to the control signal for producing a first oscillating signal having the first frequency which is determined by the TV frequency, the reference frequency and the fixed frequency;

a second oscillator incorporating a fixed element, for producing a second oscillating signal having the fixed second frequency;

a mixer means for producing a final oscillating signal by mixing the first oscillating signal and the second oscillating signal;

a detector means for detecting an aberration of the frequency of the final oscillating signal from the jamming frequency;

correcting value setting means for producing a correcting value for correcting the detected aberration of the frequency of the final oscillating signal, in which the correcting value is an integral multiplier of the reference frequency;

storing means for storing the correcting value in a memory; and correcting means for correcting the frequency of the first oscillating signal in accordance with the correcting value so as to produce the jamming signal having the jamming frequency.

7. A system according to claim 6 wherein the voltage controlled first oscillator forms a part of a phase-locked loop circuit.

8. A system according to claim 6 wherein the fixed element is a surface acoustic wave resonator.

9. A system according to claim 6, wherein the phase-locked loop circuit comprises a voltage-controlled oscillator as the first oscillator, a programmable divider controlled by the correcting means for producing a signal having a divided frequency, a phase comparator for comparing the divided frequency with the reference frequency, and a low pass filter for eliminating high frequency elements.

10. A system according to claim 6, wherein the memory of said storing means stores a plurality of control values for producing the control signals and a plurality of correcting values, one of the control values and one of the correcting values, which are determined by the TV signal, are added to each other so that the first oscillator produces a corrected first oscillating signal.

11. A system according to claim 10, wherein each of the correcting values is smaller than the predetermined difference frequency.

12. An oscillator system for producing a desired intermediate signal having a desired intermediate frequency for a double superheterodyne receiver, the system having a reference frequency generator for producing a reference frequency which is determined dependent on the desired intermediate frequency and a fixed frequency which is determined dependent on the reference frequency, comprising:

a control unit responsive to an input signal for producing a control signal dependent on a frequency of the input signal;

a first oscillator responsive to the control signal for producing a first intermediate signal having a first intermediate frequency which is determined by the input signal frequency and the reference frequency;

a second oscillator incorporating a fixed element, for producing an oscillating signal;

a mixer for producing a second intermediate signal having a second intermediate frequency by mixing the first intermediate signal and the oscillating signal;

a detector means for detecting an aberration of the frequency of the second intermediate signal from a desired intermediate frequency;

correcting value setting means for producing a correcting value for correcting the detected aberration of the frequency of the second intermediate signal, in which the correcting value is an integral multiplier of the reference frequency;

storing means for storing the correcting value in a memory; and correcting means for correcting the frequency of the first intermediate signal in accordance with the correcting value so as to produce the desired intermediate signal having the desired intermediate frequency.

* * * * *